United States Patent Office 3,369,366
Patented Feb. 20, 1968

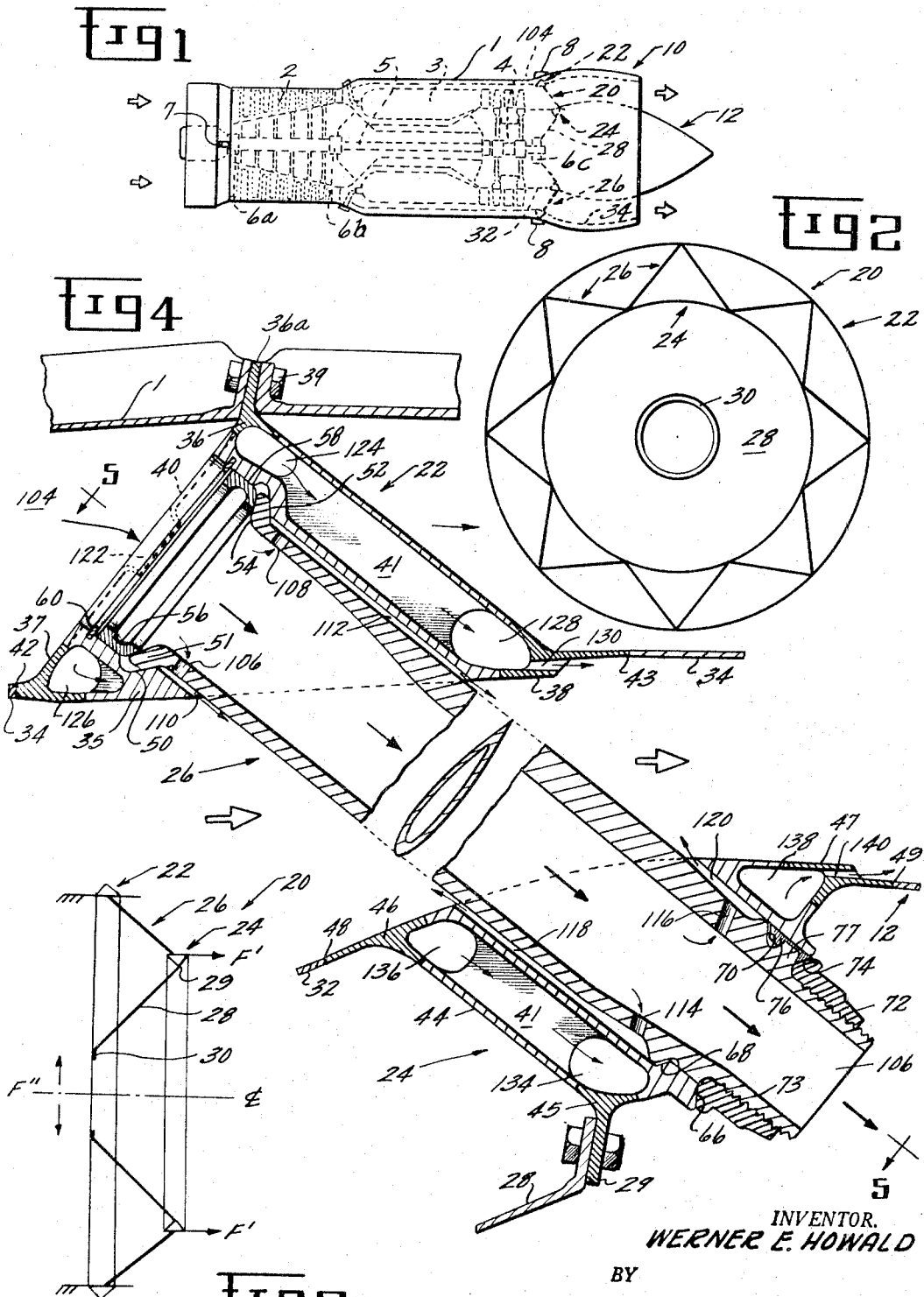

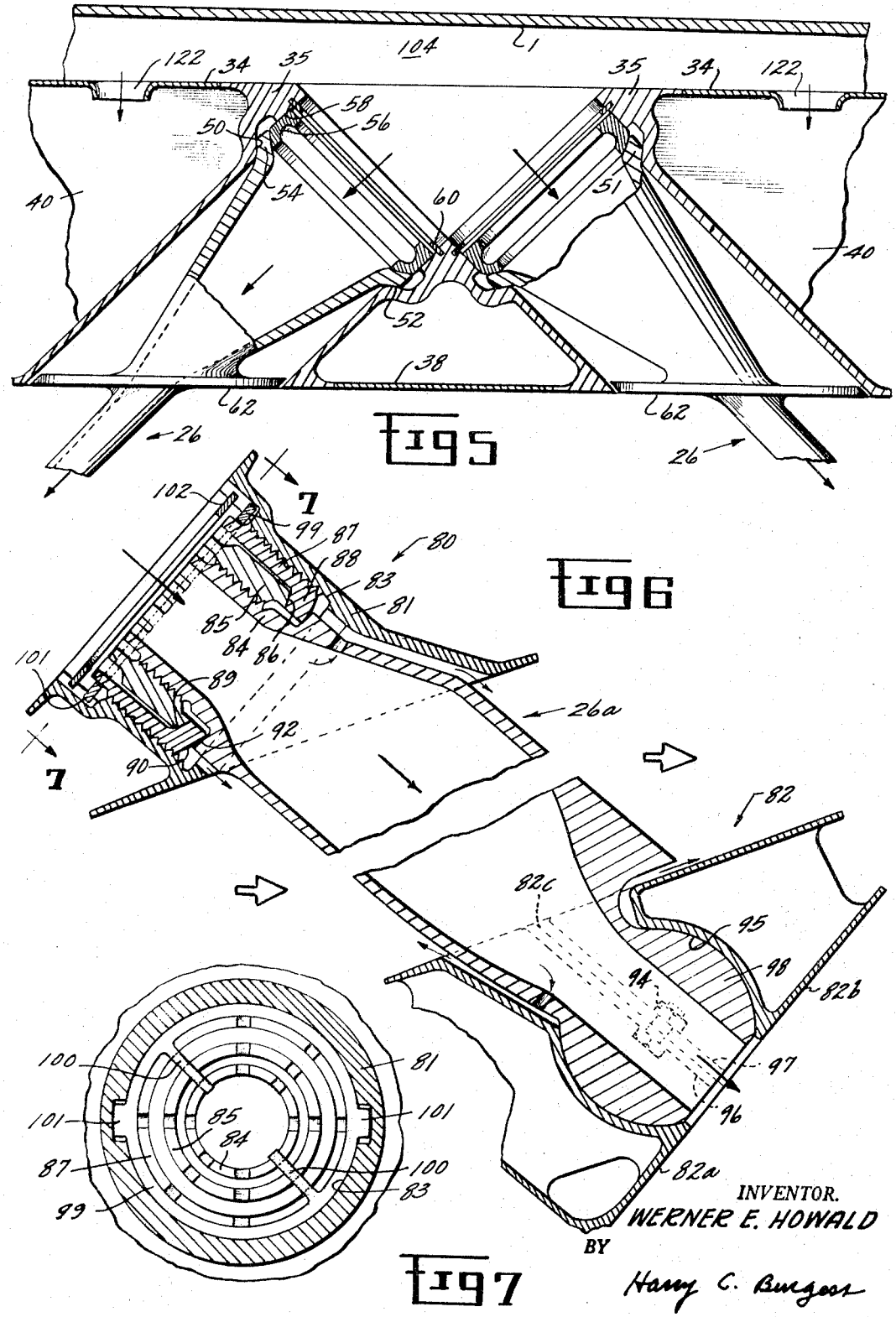

3,369,366
JET ENGINE SUPPORT STRUCTURE
Werner Ernst Howald, Cincinnati, Ohio, assignor to General Electric Company, a corporation of New York
Filed May 28, 1964, Ser. No. 370,825
7 Claims. (Cl. 60—271)

This invention relates generally to an improved support structure for a jet engine and, more specifically, to the improvement in a supporting structure or frame which may be subjected to the hot main exhaust gas jet wherein such structure is better enabled to withstand temperatures of over 2000° F. without the need for unduly increasing structural strength or coolant flow, either of which tend to be detrimental to the enhancement of jet engine thrust-to-weight ratio.

Recently designers of jet type powerplants for aircraft, e.g., gas turbine engines, have been able, through use of new design techniques and materials, to improve engine performance to permit aircraft speeds substantially in excess of the speed of sound, i.e., Mach 1.0. One technique is to use materials having high strength-to-weight ratios. Another is to achieve greater gas turbine cycle efficiencies by utilizing higher temperatures of combustion. Particularly is this true in the turbine area of the aircraft gas turbines of the well-known "turbojet" type.

With the advent of aircraft turbojet engines having turbine inlet temperatures of 2000° F. and above it has been necessary, however, to re-valuate design techniques for the structural members located downstream of the turbine, such as the supporting or frame structure for the turbine rotor bearings or the jet exhaust nozzle components, for example. It is common in axial-flow type turbojets to utilize a plurality of strut members extending radially with respect to the engine axis to support the turbine rotor bearings. An example of such a structure may be found in the application of White, Serial Number 185,778, now Patent No. 3,166,903, entitled "Rear Frame Structure," of common assignment. These struts are commonly protected from the effects of the hot main gas stream by heat shields consisting of airfoil shaped fairings spaced about the structural member or strut. If it becomes necessary, however, to increase the heat shield strength due to rising cycle temperatures at the turbine inlet area, in particular, by increasing material thickness or by providing additional amounts of cooling flow, or both, either of these techniques lead to a reduction in the thrust-to-weight ratio of the engine, which is a measure of the efficiency of the powerplant. Nevertheless, structurally reliable means must be provided to take up the increasing axial, radial and other maneuvering loads imposed on such support structures during operation of today's advanced aircraft which are capable of much greater supersonic speeds due to improved cycle efficiencies, including higher and higher turbine inlet temperature ranges.

Accordingly, the general object of the subject invention is an improvement in jet engine supporting structure operating with increasingly higher main combustible gas stream temperatures whereby the structure is made capable of withstanding such temperatures without unduly increasing the amount of the structural material, e.g., its thickness, or the amount of cooling fluid flow to the structure.

A more specific object of the invention is to provide for use in a lightweight aircraft powerplant, such as an axial-flow turbojet engine, an improved frame or support structure located downstream of the turbine and capable of reliably handling axial and radial loads and other forces tending to cause deflection, i.e., bending, of portions of the structure in the presence of severe operating temperatures, e.g., 2000° F. and above.

Therefore, in one embodiment of my invention, I provide for use in a lightweight axial-flow aircraft jet engine, an improved support comprising, an outer ring member, an inner ring member displaced radially and axially downstream of the outer ring member, a plurality of pairs of elongated strut members arranged about the engine axis and extending from one to the other of the ring members, the outer ends of the struts of each pair being in juxtaposition and the inner ends spaced circumferentially about the inner ring member, and means operative in the jet engine, e.g., rotor bearing means, and supported from the inner ring in a manner such as to apply axial and radial loads directly onto the inner ring member, the loads tending to cause deflection of the inner ring member.

A feature of my invention comprises means connecting the strut members of each pair to the inner and the outer ring members including spherical portions in at least one of the inner and the outer ring members and the end of the strut member adjacent thereto at each strut-to-ring connection to provide limited relative movement between the struts and rings to permit the strut members to transmit the axial and radial loads on the inner ring member to the outer ring member as substantially compressive and tensile loads only so as to limit deflection of the inner ring member—caused by the supported bearing means—and bending in the strut members. Means may also be included for ducting coolant internally of the strut members and for cooling of the ring members, as well.

Other objects and advantages of my invention will perhaps become more apparent when the following detailed description is read in conjunction with the accompanying drawings in which:

FIG. 1 is a side elevation, in cross section, showing a typical axial-flow jet engine utilizing the support structure of my invention and showing a general placement thereof;

FIGS. 2 and 3 are schematic illustrations of the basic design of my novel supporting structure;

FIG. 4 is an enlarged, cross-sectional view of one means by which the outer and inner ring members may be connected by the angled strut members and located relative to each other in my novel supporting structure, including an illustration of a means for cooling the structural parts;

FIG. 5 is a view taken along line 5 of FIG. 4;

FIG. 6 is an enlarged cross-sectional view of a further embodiment of the strut members including a modified adjustable locking means for retaining the strut members ends in the ring members; and FIG. 7 is a plan view, partially in cross-section, taken along line 7 of FIG. 6.

Turning now more specifically to the drawings, FIG. 1 illustrates a typical axial-flow jet engine configuration wherein an outer casing 1 surrounds a gas generator comprising a compressor 2, a combustor 3 and a turbine 4. The turbine is connected to the compressor by a shaft 5, supported by suitable bearing means 6a, 6b and 6c, the turbine causing the compressor to rotate by the power removed from the hot main gas stream comprised of the air entering the engine inlet, burned in the combustor by the addition of fuel, and exhausted from the rear of the engine as a jet, as shown by the large arrows in FIG. 1. The exhaust jet imparts thrust to the vehicle, i.e., an aircraft, in which the engine is mounted through use of well-known mounting means, such as those indicated generally at 7 and 8 in the drawing.

In the embodiment of FIG. 1, the engine shown makes use of the so-called "plug" or annular exhaust nozzle system comprising an outer shroud or rear portion of casing 1, indicated at 10, and an inner bulbous member, indicated at 12. As explained above, it has been customary to support the rear rotor bearings 6c and/or the plug nozzle member 12 by means such as disclosed in the aforementioned White application, Serial No. 185,778. My invention, now to be described in detail, avoids need for increasing the structural strength of such a structure (by cooling or increased material thickness) in the presence of higher temperatures by the following novel arrangement. The basic structure of the invention is indicated generally at 20 in FIG. 1. As shown schematically in FIGS. 2 and 3, the structure comprises an outer ring or annular structural member generally indicated at 22, an inner ring or annular structural member generally indicated at 24, the ring, member being joined by a plurality of pairs of strut members, one of which is indicated generally at 26. In order to support the rear bearing means 6c for the turbine rotor further means are provided preferably in the form of a frusto-conical member 28 having its axis co-linear with engine axis and its apex pointed in the upstream direction. The larger, i.e., downstream, circumferential edge of member 28 is attached by suitable means to a flange 29 on the inner ring or annular member 24, while the smaller or upstream edge includes a bearing support or sump attaching flange 30. As shown in the drawings, outer ring 22 is supported from or attached to a fixed member, in this instance the outer engine casing. On the other hand, the annular plug member will be attached at or to the inner ring, the surface of the plug forming an inner flowpath boundary wall for the hot main exhaust gas stream, in cooperation with an inner liner portion 32 located upstream of the ring 24 and also attached thereto. The bearing support 30, it will be noted, is approximately radially in line with the outer ring member, i.e., in the same plane. Further, it will also be preferable for one—or both—of the outer ring member and the bearing support flange 30 to be located axially of the engine approximately in the plane of one of the engine mounting means, i.e., the aft mount 8. Referring particularly to FIG. 3 and noting that the strut-to-ring connections at both ends of the struts are designed to permit limited relative movement between the parts—by reason of the novel spherical seating arrangement shown in detail in FIGS. 4–6 and hereinafter described in detail—it will be realized that I have provided a frame structure arrangement whereby no unwanted load causing moments can be transmitted from the rings to the strut.

To explain, the supporting structure of my invention is designed so that the loads are transmitted to the main outer engine structure (casing and mount) as substantially tension and compression loads only with a minimum of bending in the struts and minimum deflection—axially or radially—of the inner ring or annular structural member 24. Referring to FIG. 3, in particular, first force F' represents the axial load of the plug 12 which tends to cause either undesirable radial deflection of the inner (and outer) ring or undesirable axial movement of the bearing support, or both, during engine operation. Secondly, force F" represents a radial load which tends to cause either undesirable radial deflection of the inner (and outer) ring or undesirable axial deflection, i.e., rotation about the engine centerline, of the inner ring member 24, or both, during operation of the engine. Thus, by providing, as seen below, spherical or relatively movable connections at either strut end, by locating at least one of the major engine supporting points or mounts at or about the forward or outer ring location, so that the support structure of the invention will carry the vertical (radial) loads and possibly the axial loads, as well, depending on the kind of bearing 6c utilized (in this instance, a thrust-bearing type), and by locating the bearing support forward of the inner ring by use of the conical member 28, it is possible to transmit these loads between the ring members 24 and 22 substantially as pure tension (or compression) in the struts, while considerably reducing unwanted deflection both of the inner and the outer ring members. Furthermore, bending moments such as are found in conventional strut members are also reduced, or effectively eliminated.

Another feature of the invention and one which makes it particularly suitable for use in lightweight engines, i.e., eliminates the need for increased material strength (thickness) or unduly large amounts of cooling such as are required by the typical large protective fairing arrangements, will now be described in detail, along with several disclosed embodiments of means for maintaining the strut-to-ring connections while providing limited relative movement of struts and rings and adjustability of the mean distance (along the strut axes) between the rings. Thus, it will be seen that my novel supporting structure needs no fairings, has minimum surface area, and has airfoil shaped struts capable of *direct* exposure to a hot exhaust gas stream. Turning to FIG. 4, indicated at 34 is an outer liner spaced from the outer casing 1 to provide a duct or passage for cooling fluid (air), the flow of which is indicated by the small arrows. The outer and inner rings are similar in design, preferably being fabricated members comprising strut end castings joined to machined rings and sheet-metal shell portions. Thus, for example, the annular structural member or ring 22 includes a casing 35 joined, e.g., by butt-welding, to a plurality of machined ring portions 36–37–38. Machined ring portions 36 may include a flange 36a for joining and supporting the annular fabricated member 22 from the casing 1 by suitable fastening means, such as a rivet or bolt 39. A conical sheet-metal shell portion 40, perhaps best seen in FIG. 5, joins the castings 35 which are spaced circumferentially about the engine axis. Ribs 41 may also be provided to lend strength to the castings 35. The outer liner 34 is also butt-welded at 42 and 43 to the machined ring portions 37 and 38, respectively, to form the outer flowpath boundary wall.

Similarly, the inner ring member 24 is fabricated from a casting 44 joined to a plurality of machined ring portions 45, 46, and 47, the latter being butt-welded at 48 and 49 to the inner liner or flow boundary wall 32 and the plug 12, respectively. A sheet-metal shell member (not visible) is likewise provided and joins the inner ring member castings to complete the fabrication. Use of strut end castings in the fabrication has an added advantage in that while simple, it also helps to reduce stress concentrations in the lightweight structure.

Another feature of the invention is the manner in which I provide for the connection between the outer and inner ring members 22 and 24 and the pairs of struts. It will be realized from FIG. 2 that the struts comprise eight pairs arranged with their outer ends in juxtaposition and their inner ends spaced circumferentially—the inner ends of adjacent pairs also preferably being closely adjacent each other. The actual contact between the strut ends and the castings are in the form of relatively movable seating portions, preferably spherical, as in the embodiments disclosed herein. Referring first to the outer strut-to-ring connections, illustrated at 50 in FIG. 4 is an outer ring member spherical seating portion. It will be noted that the strut outer end is slightly flared at 51 including a first spherical seating portion 52 closely adjacent and in apposition to seat 50. Similarly, the enlarged strut end has a second oppositely-facing seating portion 54. The latter faces outwardly of the strut and is engaged by a locking member in the form of a plug insert 56 which fits snugly within a recess 58 in the casting and is adapted to be retained therein by a snap ring 60. Alternatively, a threaded nut (not shown) could be engaged with like threads in the casing recess walls and kept from rotating by a tab washer. In any event, the strut is free for limited movement along its own axis and for limited relative rotation with respect to the outer ring member casting or seat. As best shown in FIG. 5, the outer end of each strut includes an angled circular (oval when viewed perpendicular to its surface) flange portion 62, which forms part of the outer liner or flowpath boundary wall comprising ring portion 38 and liner 34.

While limited relative rotational movement between the strut and ring is permitted, means are included to prevent strut rotation about its own axis at the inner strut end-to-ring connection, as now described. Again referring to FIG. 4, there is provided at 66 a first spherical seat portion on the inner wall of the casting 44 and a second like seat portion 68 located inwardly of the former. In close apposition to the latter seat portion 68 is an inner strut and spherical seating portion 70 adapted to mate—alternatively—with seat 68, as hereinafter described. Also provided at the inner strut-to-ring connection is a removable fastener in the form of a nut 72 threadably engaged with an extension 73 of the strut end. Nut 72 also includes a rounded or spherical seat portion 74 adapted to be placed in close apposition to the ring member seat 66 when the nut is axially located on the strut in the desired position. The ring casting is slotted or cut away at 76 and a tooth or dog 77 provided on the strut to prevent the strut rotating about its axis for the reason mentioned above.

The primary reason for the difference in design of the outer and the inner ring-to-strut seating arrangements is due to the normally prevailing axial load condition. That is, it will be noted that in the latter the primary seating portions are on the ring member and on the fastening means, i.e., seats 66 and 68 (on the casting 44) and seat 74 (on the nut 72). The loads from the supported means, e.g., the rotor bearings and/or the exhaust nozzle plug are transmitted to the struts 26 by the inner ring and nut on the nut seats itself against the casting which allows the proper strut-to-ring connection but does not hinder the desired limited relative (rotary) movement between the strut and inner ring. The function of the "seat" portion 70 on the inner strut end—actually a shoulder—is to prevent "reverse" movement of the struts. To explain, it would be possible in some operating situations, e.g., certain aircraft maneuvers or other flight conditions, to have reverse motion of the struts, that is a generally outward movement of inner ring 24 (and the struts) tending to close or shorten the distance between the outer and inner rings, due to reversing of the normal bearing loads and/or unusual nozzle member bending moments. Should this tend to occur, seat 68 on the casting will contact seat (shoulder) 70 as the inner ring is deflected. This will, of course, tend to leave a slight gap between the opposed seating surfaces 66–74 on the casting 44 and nut 72, respectively. Normally, however, the pairs of strut members are arranged to connect the inner and outer annular structural or ring members 22–24 in a manner such as to greatly reduce or substantially eliminate radial and axial deflection of the inner ring member—in particular—and bending moments in the struts themselves by providing (1) limited relative rotary movement between the strut ends (seats) and the ring member (casting seats) and (2) limited axial (with respect to the longitudinal axes of the strut members) movement of the struts, wherein inner opposing seats 66–74 are in abutment, as well as the outer seats 50–52 (on the outer ring member casting 35 and the flared outer strut end 51, respectively), the struts being loaded in substantially pure tension with little, if any, of the radial and axial loads imposed on the inner ring member being transmitted to the struts and, hence, to the outer ring member. As stated, in this situation with forces F′ and F″ (see FIG. 3) in operation, there is clearance between snap ring 60 and plug insert 56 or, alternatively, clearance between the strut end seat 54 and the plug.

If closer control of the flowpath annulus formed by the inner and outer ring members 22–24 is desired, or, if means are required to ensure more complete roundness of the support structure (constant annulus area) means may be provided for limited relative adjustment of the distance between the rings at the location of the juxtaposed outer strut ends which, as has been seen, are circumferentially spaced about the engine axis. Referring now to this feature of my invention more specifically, it will be noted in FIG. 6 that struts 26a are joined to modified outer and inner annular structural or ring members, indicated generally at 80 and 82, respectively. Ring member 80 is comprised of a casting 81 having a recess 83 for each strut end. The recess receives the outer end of strut 26a which has a reduced portion 84 including an outer circumference threadably engaged with a first or inner locking member 85. The first locking member is adapted to be positioned axially with respect to the strut end and includes a spherical seat portion 86 thereon. Spaced outwardly of and coaxial with the first locking member is a second locking member 87 threadably engaged in the recess 83. The second locking member has an inwardly turned flange portion 88 having a first or outer seat portion 89 and a second or inner seat portion 90 thereon. The seats 89–90 are in apposition, respectively, to the first locking member seat portion 86 and another spherical seat 92 on the reduced outer end portion of strut 26a. By positioning locking members 85 and 87 axially the strut can be located along the line of its axis to space the outer and inner ring members since the strut-to-inner ring member 82 connection has been modified to permit limited relative rotary movement but prevent relative motion of the inner strut end outwardly—or inwardly—of the inner ring member. Thus, the inner ring 82 comprises cast sections 82a and 82b split along line 82c. Suitable fastening means 94 are provided, such as a bolt and nut, to join the sections. Spacing and maintenance of the size and shape of the spherical cavity or seat 95 is maintained by flanges 96 and 97 forming part of sections 82a and 82b, respectively, along the split line 82c. The inner end of strut 26a is formed as a partial sphere 98 adapted to be retained in ring 82 in close abutment with the walls of the cavity 95. After the sections of ring 82 have been joined and strut 26a secured, and locking means 85 and 87 adjusted, a tabbed ring member 99 is located in the recess 83 outwardly of the threaded portion. As seen more clearly in FIG. 7, the tabbed ring 99 includes at least two ribs 100–100 and a pair of ears 101—101 to secure the strut end 84 and locking members 85 and 87 rotatively (and axially) with respect to each other and to the ring member 80. The ribs 100—100 fit in slots cut in the strut end and the locking members, similar to a "castle nut" arrangement. A snap ring 102 retains tabbed ring 99 in the casting recess.

As shown and described herein, my support structure has particular utility when subjected to very hot exhaust gas streams, i.e., 2000° F. and higher. The concept of arranging the inner annular structural member radially inward and axially downstream of an outer structural member, joining the two members by pairs of struts slanted backward (and relatively movable within the annular members) wherein the angle of the struts is selected to minimize deflection, say in a rotor bearing support wherein the primary support attachment, e.g., the bearing support member 28, connected to the bearing sump is located somewhere near the plane of the main engine mounts, can have applicability to other frame or supporting components of any typical axial-flow turbojet or turbofan engine. However, where the environment is a hot gas stream my frame structure is particularly suited to make use of a minimum amount of cooling fluid flow which, as stated above, is beneficial to the engine efficiency, i.e., its thrust-to-weight ratio. Referring to the drawings, as seen in FIGS. 4 and 5, cooling air is ducted rearwardly to the frame through a passage 104 formed by the outer casing and outer liner, the air entering the open outer ends of the struts at the location of the casting 35 of the outer rings 22 (or casting 81 in FIG. 6). The air travels down the hollow struts (as shown by the small arrows) for convection cooling since the struts are narrow and airfoil shaped in profile a relatively small amount of coolant flow by volume is required, compared to the conventional large faired strut arrangement. Most of the air exits at the strut inner end at 106 to be returned to the gas stream through openings in the exhaust nozzle plug wall. However, it may also be advisable to cool the ring members 22 and 24 (or 80 and 82 in FIG. 6) and, therefore, means are provided to allow air to escape to the rings. At the outer end small transverse passages 106 and 108 duct cooling air to cool the inner walls of casting 35, the air flowing through gaps or passages 110 and 112, respectively, and escaping to the main gas flow passage where it turns and flows across the strut outer surface. A similar arrangement cools the inner casting walls, as seen in FIG. 4, wherein transverse passages 114 and 116 duct cooling air to channels 118 and 120, respectively, formed between the strut outer surface and the casting. Even if the struts rotate there will always be some flow through the passages 110–112–118–120. Further, cooling for the outside walls of the casting and for the general surface area of the fabricated ring members can also be provided by air ducted from passage 104 through openings 122 in the sheet-metal shell portion 40 of the outer ring member, for example. A portion of this air flow will enter gaps provided at the areas where the machined ring portions 36, 37 and 38 join the casting to further cool the fabricated ring. Thus, air enters at 124, 126 and 128, respectively, with the flow from opening 124 preferably being passed over the rib 41 and flowing out a slot 130 (together with the flow entering at 128) for partial film cooling of the outer liner 34. Similar openings 134, 136 and 138 and a slot 140 are provided to cool the inner ring member 24. Other cooling methods could be employed, such as diffusion cooling, although the size and arrangement of the transverse holes and the volume of cooling air required would have to be altered from that of the disclosed arrangement.

It will be realized that the disclosed embodiments of my invention include eight pairs of struts arranged circumferentially between outer and inner structural ring members. This arrangement was chosen as having an optimum result from an aerodynamic and a structural integrity standpoint; that is, increasing the number of struts unduly increased flow blockage while increasing integrity, while reducing the member had the opposite effect. Naturally, substantial changes in the gas generator inner and outer radius (flow) ratio could alter the number of required members. Through experiment it was found that the paired strut arrangement substantially eliminated any tangential load component in the rings and struts radial and axial load components in the structure caused by bearing loads—which may also cause rotational or torque loading on the inner ring—which has an effect on the optimum strut angle, as shown in FIGS. 4 and 6. However, since the axial load (for F' in FIG. 3) is usually the primary consideration, the strut angle is selected to reduce bending and deflection in the struts and inner ring in the presence of the aforementioned axial and radial loads and any overturning moments (due to vertical loads imposed on the exhaust nozzle member, if present). By varying the projected strut angle, minimization of the effect of force F' in the presence of force F"—and any overturning moments—is achieved. An example of an optimum angle for a force F' of 50,000 ft.-lbs. and a force F" of 5,000 ft.-lbs. for a particular engine radius ratio was found to be 37° relative to the engine axis.

It is understood that while I have shown and described several embodiments of my invention, the teachings herein are not limited solely to these embodiments and that such other modifications and changes to the structure disclosed as are within the skill of the art are intended to be within the scope of the claims appended hereto.

I claim:

1. In a lightweight axial-flow gas turbine engine having an outer casing with means thereon for mounting said engine in an aircraft, an outer liner spaced inwardly of said casing, and an inner liner, said inner and outer liners forming a flowpath for the engine exhaust gas stream, an improved support structure subjected to said exhaust gas stream and comprising:

an outer ring member;
an inner ring member displaced radially and axially downstream of said outer ring member;
a plurality of elongated hollow struts arranged circumferentially about the engine axis and extending from one to the other of said ring members;
means supported from said inner ring member including a frusto-conical member having its axis co-linear with the engine axis and having its larger circumferential edge affixed to said inner ring member and its smaller circumferential edge located axially of said engine approximately in the plane of said mounting means, a radial flange at said smaller circumferential edge, and turbine rotor bearing means supported from said flange, said bearing means applying axial and radial loads on said inner ring member through said frusto-conical member during operation of said engine;
means connecting said struts to said inner and said outer ring members including spherical portions on at least one of the said ring members and the end of the said strut adjacent thereto at each strut-to-ring connection to provide limited relative movement therebetween to permit struts to transmit the axial and radial loads imposed on said inner ring member by said rotor bearing means to said outer ring member as substantially compressive and tensile loads only so as to limit radial and axial deflection of said inner ring member.

2. In a lightweight axial-flow gas turbine having an outer casing with means thereon for mounting said engine in an aircraft, an outer liner spaced inwardly of said casing, and an inner liner, said outer and inner liners forming a flowpath for the engine exhaust gas stream, an improved support structure subjected to said exhaust gas stream and comprising:

a first annular structural member, said first annular member being affixed to the outer casing and being located axially of said engine approximately in the plane of said mounting means;
a second annular structural member, said second annular member being displaced radially inwardly and axially downstream of said first annular member and being affixed to said inner liner;
a plurality of pairs of elongated hollow struts, said pairs being equally spaced about the engine axis and extending from one to the other of said annular structural members, with the struts of each pair arranged so that their outer ends are in juxtaposition and their inner ends are spaced circumferentially;
means supported from said second annular member including a frusto-conical member having its axis co-linear with the engine axis and having its larger circumferential edge affixed to said second annular member and its smaller circumferential edge located axially of said engine approximately in the plane of said mounting means, a radial flange at said smaller circumferential edge, turbine rotor bearing means supported from said flange, and an axially-extending annular exhaust nozzle member affixed to said inner liner adjacent said second annular member, said bearing means and said exhaust nozzle member imposing axial and radical loads directly onto said second annular structural member during operation of said engine;
means connecting the juxtaposed outer ends of said pairs of struts to said first annular structural member and said circumferentially spaced inner ends to said second annular structural member, said connecting means including first and second spherical seat portions in said first and second annular members, respectively, like spherical seat portions on said juxtaposed outer strut ends and said spaced inner strut ends adapted to mate with said first and second structural member, seat portions, respectively, first locking means for maintaining said first annular member seat portions in close apposition to said like portions on said outer strut ends, and second locking means adapted to maintain said second spherical seat portions in close apposition to said like seat portions on said inner strut ends, said connecting means providing limited relative movement between said first and second annular structural members and said hollow struts at the ends thereof to permit said struts to transmit the axial and radial loads directly imposed on said second annular structural member by said supported means to said first annular structural member as substantially compressive and tensile loads only so as to limit radial and axial deflection of said second annular member and bending in said struts.

3. In a lightweight axial-flow aircraft jet engine, an improved support structure, said support structure comprising:
an outer ring member;
an inner ring member displaced radially and axially downstream of said outer ring member;
a plurality of elongated strut members arranged circumferentially about the engine axis and extending from one to the other of said ring members;
means supported from and operative in said jet engine to apply axial and radial loads directly onto said inner ring member;
means connecting said strut members to said outer ring member including an outer spherical seat portion on each outer strut end, and adjustable means for locking said strut member outer end in said outer ring, said adjustable means including:
a first locking member removably engaged with said outer strut end, said first locking member having a spherical seat portion thereon,
a second locking member coaxial with and spaced outwardly of said first locking member, said second locking member being removably engaged with said outer ring and having a pair of oppositely-directed seat portions interposed between said first locking member seat and said outer strut end seat, said first and second locking members each being axially adjustable with respect to each other, and to said outer strut end and said outer ring member when so engaged therewith,
and ring means securely locating said first and second locking members axially with respect to each other and to said outer strut end and said outer ring member;
and means connecting said strut members to said inner ring member including:
an inner spherical seat portion on each inner strut end, and an inner spherical seat portion in said inner ring member in apposition to said seat on said inner strut end and adapted to mate therewith,
each of the said pair of oppositely-directed second locking member seat portions mating alternatively with respective ones of said first locking member and outer strut end seat portions whereby limited relative movement between said strut members and said outer and inner ring members is provided and said strut members transmit said axial and radial loads imposed on said inner ring member by said supported and operative means to said outer ring member as substantially compressive and tensile loads only so as to limit bending in said strut members and axial and radical deflection of said inner ring member as caused by said supported and operative means.

4. In a lightweight axial-flow aircraft jet engine, an improved support structure, said support structure comprising:
an outer ring member;
an inner ring member displaced radially and axially downstream of said outer ring member;
a plurality of pairs of elongated hollow struts arranged about the engine axis and extending from one to the other of said ring members, with the struts of each pair having their outer ends in juxtaposition and their inner ends spaced circumferentially;
means supported from and operative in said jet engine to apply axial and radial loads directly onto said inner ring member;
first connecting means for each of the struts of said pairs and said outer ring member including:
an enlarged outer strut end portion having first and second spherical seat portions thereon,
means in said outer ring providing a like spherical seat portion in apposition to said first outer strut end seat,
and first locking means removably engageable within said outer ring and located immediately outwardly of said enlarged strut end, said first locking means having a like spherical seat portion thereon in apposition to said second outer strut end seat portion;
and second connecting means for each of the struts of said pairs and said inner ring member including:
an inner spherical strut end seat portion,
a pair of oppositely-directed inner ring member spherical seat portions,
and a fastener member removably engaged with said strut member inner end outwardly of said inner strut end seat and including a seat portion in apposition with one of said pair of inner ring member seat portions,
whereby when said first outer strut end seat portions mate with said outer ring seat portions slight clearance is provided between said fastener member seat and said one of said pair of inner ring member seat portions, and when said fastener member seat portion mates with said one of said pair of inner ring member seat portions slight clearance is provided, respectively, between said first outer strut end seat portion and said outer ring member seat portion and between the other of said inner ring member seat portions and said inner strut end seat portion to permit limited relative movement between said strut members and said rings and limited adjustment of the distance between said inner and outer ring members along the axis of each strut, said pairs of struts transmitting said axial and radial loads imposed on said inner ring member by said supported operative means to said outer ring member as substantially compressive and tensile loads only so as to limit axial and radial deflection of said inner ring member caused by said supported and operative means.

5. In a lightweight axial-flow gas turbine having an outer casing with means thereon for mounting said engine in an aircraft, an outer liner spaced inwardly of said casing and an inner liner, said outer and inner liners forming a flowpath for the engine exhaust gas stream, an improved support structure subjected to said exhaust gas stream and comprising:
an outer ring member;
an inner ring member displaced radially and axially downstream of said outer ring member;
a plurality of elongated hollow strut members arranged circumferentially about the engine axis and extending from one to the other of said ring members;
means supported from said inner ring member including a frusto-conical member having its axis co-linear with the engine axis and having its larger circumferential edge affixed to said inner ring member and its smaller circumferential edge located axially of said engine approximately in the plane of said mounting means, a radial flange at said smaller circumferential edge, turbine rotor bearing means supported from said flange, and an axially-extending annular exhaust nozzle member affixed to said inner casing adjacent said inner ring member, said bearing means and said exhaust nozzle member imposing axial and radial loads directly onto said inner ring member during operation of said engine;

means connecting said strut members to said outer ring member including an outer spherical seat portion on each outer strut end and adjustable means for locking said strut member outer end in said outer ring, said adjustable means including:
- a first locking member removably engaged with said outer strut end, said first locking member having a spherical seat portion thereon,
- a second locking member coaxial with and spaced outwardly of said first locking member, said second locking member being removably engaged with said outer ring and having a pair of oppositely-directed seat portions interposed between said first locking member seat and said outer strut end seat, said first and second locking members each being axially adjustable with respect to each other, and to said outer strut end and said outer ring member when so engaged therewith,
- and ring means securing said first and second locking members axially with respect to each other and to said outer strut end and said outer ring member;

means connecting said strut members to said inner ring member including an inner spherical seat portion on each inner strut end, and an inner spherical seat portion in said inner ring member in apposition to the seat on said inner strut end and adapted to mate therewith;

wherein said pair of oppositely-directed second locking member seat portions mate alternatively with respective ones of said first locking member and said outer strut end seat portions to permit limited relative movement between said strut members and said outer and inner ring members, said strut members transmitting said axial and radial loads imposed on said inner ring member by said bearing means and said exhaust nozzle member to said outer ring member as substantially compressive and tensile loads with minimum bending in said strut members and so as to limit axial and radial deflection of said inner ring member as caused by said supported means;

and means supplying cooling air to said hollow strut members and said ring members through the passage formed by said outer casing and said outer liner including enlarged axially directed openings in the strut outer ends and relatively small transverse strut wall openings adjacent the inner and outer strut ends for ducting cooling air to said ring members through small passages formed between the said ring members and their respective strut ends.

6. In a gas turbine engine having means for generating, within a generally cylindrical casing, a high energy gas stream which is discharged axially thereof, and an inner member upon which the gas stream produces a reactive axial loading, means for supporting said inner member comprising,
a plurality of struts extending between said casing and said member, said struts being angled from said casing to said member in a direction downstream of the gas flow, the ends of each strut being angularly offset when viewed in a direction axially of said casing, with each strut of an adjacent pair being offset in a different direction, and spherical mounting means for securing the ends of said struts respectively to said casing and said inner member, whereby the force loading on said struts is substantially entirely in a longitudinal direction regardless of the resultant forces on said member or said casing.

7. In a gas turbine engine mounting means as in claim 6 wherein, the ends of said struts secured respectively to said casing and said member are juxtaposed and form a generally star shaped configuration when viewed axially of said cylinder axis.

References Cited
UNITED STATES PATENTS

| | | | |
|---|---|---|---|
| 2,410,450 | 11/1946 | Kroon | 60—39.37 |
| 2,813,396 | 11/1957 | Kress | 60—39.32 |
| 3,141,299 | 7/1964 | Petrie et al. | 60—39.31 X |

CARLTON R. CROYLE, *Primary Examiner.*

BENJAMIN A. BORCHELT, *Examiner.*

G. H. GLANZMAN, *Assistant Examiner.*

UNITED STATES PATENT OFFICE
CERTIFICATE OF CORRECTION

Patent No. 3,369,366                      February 20, 1968

Werner Ernst Howald

It is hereby certified that error appears in the above numbered patent requiring correction and that the said Letters Patent should read as corrected below.

Column 8, line 31, after "permit" insert -- said --; line 70, for "radical" read -- radial --.

Signed and sealed this 13th day of May 1969.

(SEAL)
Attest:

Edward M. Fletcher, Jr.
Attesting Officer

Commissioner of Patents